Figure 1:
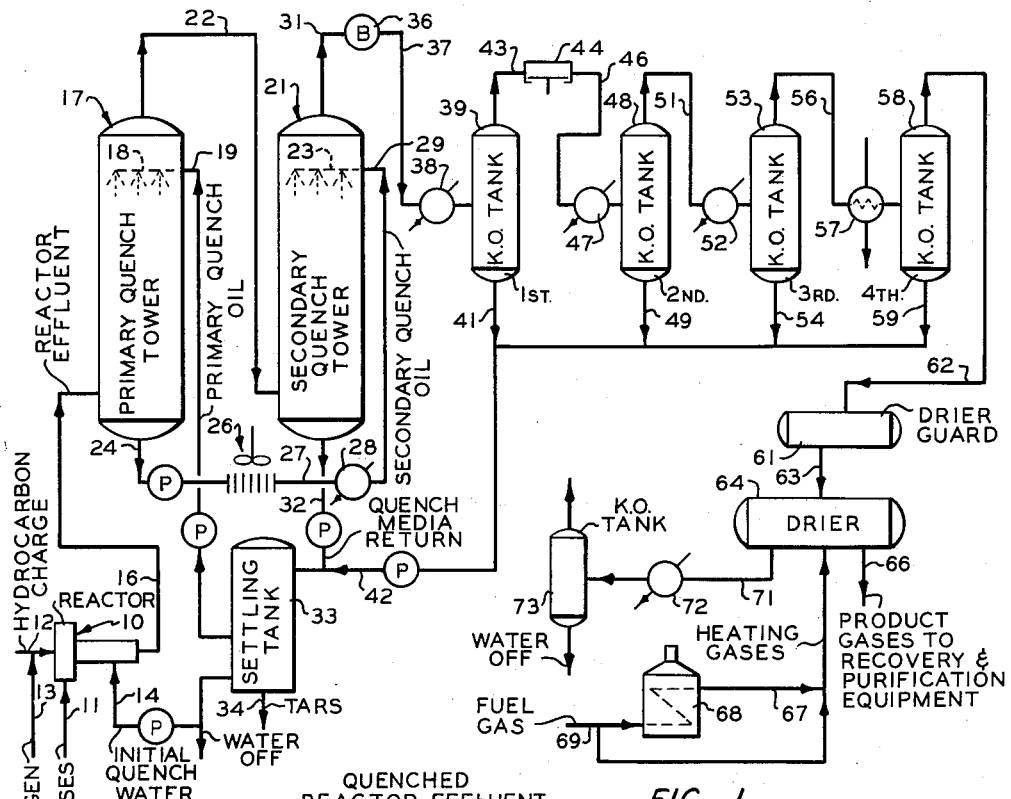

May 2, 1961

J. W. DAVISON 2,982,794

PREPARATION OF REACTOR EFFLUENT FOR RECOVERY
OF ACETYLENE AND THE LIKE THEREFROM

Filed May 13, 1958

INVENTOR.
J.W. DAVISON

BY Hudson & Young

ATTORNEYS

United States Patent Office 2,982,794
Patented May 2, 1961

2,982,794

PREPARATION OF REACTOR EFFLUENT FOR RECOVERY OF ACETYLENE AND THE LIKE THEREFROM

Joseph W. Davison, Bartlesville, Okla., assignor to Phillips Petroleum Company, a corporation of Delaware Filed May 13, 1958, Ser. No. 734,931

10 Claims. (Cl. 260—679)

This invention relates to the preparation of reactor effluent for the recovery of acetylene and the like therefrom. In another aspect, it relates to an improved method and apparatus for preparing low molecular weight cracked gases for recovery of acetylene therefrom. In another aspect, it relates to an improved method and apparatus for quenching and drying low molecular weight hot, cracked gases obtained from a thermocracking operation, so as to prepare said gases for the recovery of acetylene and the like therefrom.

In recent years, increased demand for commercial acetylene has resulted in considerable effort directed toward its production by high temperature cracking of low molecular weight, normally gaseous hydrocarbons, such as methane, ethane, propane, butane, natural gas, and the like, in a thermocracking furnace. Normally, the hot furnace or reactor effluent gases, containing acetylene and other low molecular weight cracked gases, are subjected to quenching operations to cool the gases and remove undesirable components such as tars, aromatics, carbon black and condensible vapors. Following the quenching operation, the cracked gases are then compressed and dried, and the acetylene and other valuable cracked products are recovered and purified.

Many of the operations heretofore proposed, patented, or used in commercial operations for preparing the hot, low molecular weight cracked gases for recovery of components therefrom have been found wanting for one reason or another. Many of the prior art quenching operations, especially where water is used as the quenching media, are inefficient and uneconomical because of the extremely high temperatures of the reactor effluent. The use of water as the sole quenching media often results in the generation of enormous quantities of steam, thereby necessitating a large investment in heat exchange equipment to cool the effluent mixture. The use of water as a quenching media often does not effectively remove tars and other contaminants; rather, a substantial portion of these contaminants are carried over with the reactor effluent-steam mixture. Since this mixture must be cooled, the presence of these contaminants often results in the build-up of deposits on the large heat exchange surface necessary to effect cooling of this mixture. The contaminants also tend to build up in compressors; generally, because of this deposition the more expensive positive displacement and reciprocal types of compressors must be used since they can tolerate more tar deposition than the centrifugal type of compressor, which but for the deposition problem, are generally more economical. These contaminants give rise to further inefficiency in the drying operation, where beds of desiccant become loaded with the tars and moisture carried along with the effluent mixture. Moreover, cracked olefinic gases, if not removed early in the operation, have a tendency to polymerize on contact with the dessicant; as a result such polymer deposition further reduces the useful life of the desiccant bed.

Figure 2:
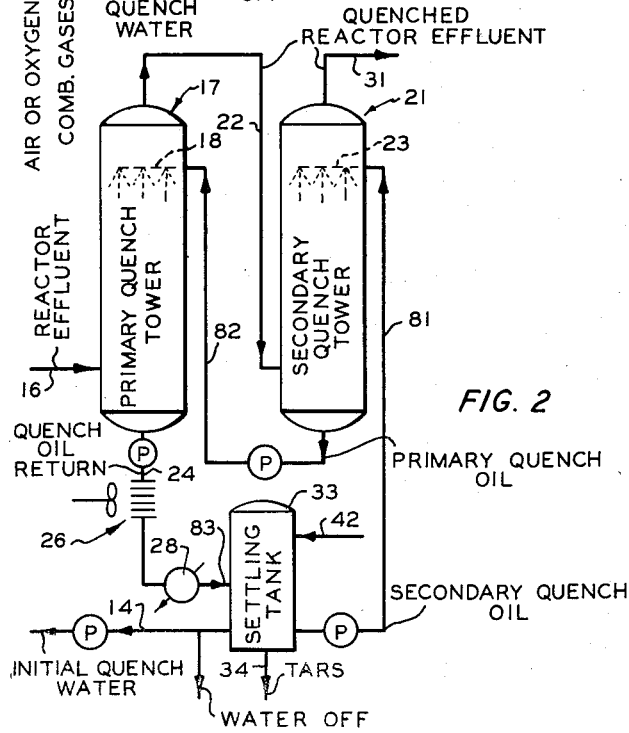

Accordingly, an object of this invention is to overcome the aforementioned problems by the provision of an improved method and apparatus for preparing low molecular weight cracked gases for the recovery and purification of valuable cracked products therefrom, such as acetylene. Another object is to provide an improved method and apparatus for quenching, cooling, compressing and drying low molecular weight cracked gases obtained from a thermocracking operation, so as to prepare said gases for the recovery of acetylene and other components therefrom. Another object is to effect economical quenching, scrubbing, and cooling of hot reactor effluent without requiring excessive indirect heat exchange surface area. Another object is to effectively quench hot reactor effluent at a high temperature level and effect a greater initial separation of tars and other contaminants therefrom. Another object is to quench high temperature reactor effluent in such a manner as to offset the need for expensive quench media cooling equipment. Another object is to decrease the amount of water and contaminants in reactor effluent so as to enable the use of a centrifugal compressor and so as to increase the useful life of desiccant necessary to dry the effluent prior to the recovery of acetylene and other cracked products therefrom. A further object is to remove from the reactor effluent sufficient heavy olefinic hydrocarbons to allow drying of the effluent prior to heavy acetylene absorption. Further objects and advantages of this invention will become apparent to those skilled in the art from the following discussion, appended claims, and drawing in which:

Figure 1 is a diagrammatic flow sheet illustrating one embodiment of this invention; and Figure 2 is a partial diagrammatic flow sheet illustrating a modification of that shown in Figure 1.

Referring now to the drawing, in which like parts have been designated with like reference numerals, and initially to Figure 1, a thermal cracking furnace or reactor generally designated 10 is shown. Reactor 10 is preferably a tangential burner-reactor such as that disclosed and claimed in U.S. Patent 2,750,434, issued June 12, 1956, to Joseph C. Krejci. As disclosed in U.S. Patent 2,750,434, the tangential burner-reactor, or furnace system, contains two cylindrical sections, one of which may be termed a precombustion section, and the other, a reaction section. These two sections are adjacent each other and coaxial, and are preferably disposed horizontally. The combustion section is positioned upstream from the reaction section and ordinarily has a shorter length and a larger diameter as compared to the adjacent disposed reaction section. In Figure 1, a combustible fuel mixture, such as a mixture of natural gas and oxygen, is passed via line 11 into the precombuston chamber of said reactor 10 in a direction tangential to its inner side wall, while at the same time hydrocarbon reactant is axially introduced via line 12 into the combustion section of the furnace, alone or with additional oxygen or air supplied via line 13. The tangentially introduced fuel is burned, upon or prior to entrance into the combustion chamber, and the resulting total hot product of burning, i.e., combustion gas, comes into contact and in direct heat exchange relation with the axially introduced hydrocarbon charge. The tangentially added mixture is injected into the combustion chamber of the furnace at a sufficiently high velocity to cause combustion gas formed therein to flow spirally inward, and subsequently helically downstream through the reaction section. Combustion gas thus formed, together with axially introduced hydrocarbon, is passed into the reaction section in an initial state of annular separation. The helically moving combustion gas forms a gas blanket adjacent to the reactor wall, and in this manner, direct contact of the hydrocarbon reactant with the reaction chamber walls is substantially prevented, and carbon deposition is greatly reduced.

The hydrocarbon reactant or charge can be one of various hydrocarbon cracking stocks, such as methane, ethane, propane, butane, natural gas, and light vaporizable, low molecular weight hydrocarbons. In some cases, it may be desirable to axially introduce the hydrocarbon charge along with steam. The specific reaction temperature used will depend upon the product desired and the hydrocarbon reactant to be reacted. Generally, the reaction temperature employed for the predominant production of olefinic hydrocarbons will be in the range between about 1300 and 1900° C., and the temperature range for the production of acetylene will be from about 1900 to 3500° F. Within these temperature ranges carbon deposit is greatly minimized or entirely eliminated and light olefinic hydrocarbons, particularly ethylene and propylene, and acetylene are produced and recovered in high yield, together with aromatic hydrocarbons, higher molecular weight olefins, valuable paraffins, and the like, as by-products. The cracking reaction is also accompanied by the formation of tars and other undesirable components and it is necessary to remove these materials as soon as possible from the valuable gaseous products.

Referring now again to Figure 1, at a point immediately downstream of the reaction section of furnace 10 the reactor effluent is initially quenched with water supplied via line 14. Quenching the reactor effluent in this manner limits the reaction time and minimizes decomposition or undesirable reactions of the cracked gases, and to some extent lowers the temperature of the effluent. The reactor effluent and water vapor are then conducted from the furnace 10 via a reactor effluent line 16, the latter preferably being a rather long pipe so that the effluent is in indirect heat exchange with the atmosphere to effect further cooling of the reactor effluent.

The hot reactor effluent is passed via pipe 16 to a vertically disposed primary or high temperature quench tower, generally designated 17, and introduced in the bottom section thereof, for example, at a temperature between about 470 and 800° F. Primary quench tower 17 can be provided with conventional vapor-liquid contacting means, such as baffles, bubble cap trays, Schneible trays, or the like. The reactor effluent gases flow upwardly in the primary quench tower 17 in countercurrent relation with downwardly descending oil quench media, such as mineral seal oil, having a temperature between about 95 and 240° F., sprayed by means 18 in the upper end of the quench tower via line 19. The direct contact of the reactor effluent and quench oil in the primary quench tower 17 results in the cooling and scrubbing of the effluent gases and the initial removal of large amounts of tars, heavy olefins and aromatics and other undesirable components from the effluent gases. Quenching the hot reactor effluent (e.g., 600° F.) with oil is advantageous over the use of water as a quench media since at the high temperatures involved water quench media would immediately flash and the large quantities of steam produced would be carried over along with tars and other contaminants. Moreover, a water quench would not remove tars, etc., as effectively as the oil quench because the water quench depends on mechanical contact and condensation whereas an oil quench removes the tars by selective absorption.

The partially cooled reactor effluent gases, having a temperature between about 140 and 245° F., then pass via overhead conduit 22 from the top of the primary quench tower 17 to the lower section of a secondary or low temperature quench tower generally designated 21. In the secondary quench tower 21, the effluent gases again flow upwardly in countercurrent relation to downwardly descending secondary quench oil, having a temperature between about 86 to 165° F., sprayed in the upper end of the secondary quench tower by means 23, such as suitable spray equipment. In the embodiment shown in Figure 1, tar bearing primary quench oil is withdrawn from the bottom of the primary quench tower 17 and pumped via line 24 to an indirect air cooled heat exchanger generally designated 26, such as an air fin cooler. The cooled quench oil then is passed via line 27 to a quench oil cooler 28, and then the further cooled quench oil is conducted via line 29 to spraying equipment 23 and sprayed in the top of the secondary quench tower where residual tars and other contaminants are removed from the effluent gases, the further cooled and cleansed effluent gases being removed as overhead from the top of the secondary quench tower 21 via line 31. The spent secondary quench oil is withdrawn from the bottom of the secondary quench tower 21 and conducted via line 32 to a phase separation zone as settling tank 33, from which clean primary quench oil is withdrawn and pumped via line 19 to the upper end of primary quench tower 17. Tars and other contaminants can be removed from settling tank 33 via line 34, and water required for the initial quenching of the reactor effluent gases is withdrawn from the settling tank and pumped via line 14.

The use of an oil quench, rather than a water quench, removes heat from the gases at a high-temperature level which permits the dissipation of heat through air fin coolers or heat recovery by exchange. Moreover, the use of the economical, closed recycling quench oil system results in effective removal of tars, heavy olefinic hydrocarbons, etc., and permits drying and acetylene absorption to be carried out without a prior deoiling step and, in turn, allows heavy acetylenes to be removed from the relatively small acetylene product stream, rather than from the total cracked gas stream.

The quenched reactor effluent gases, having a temperature between about 95 to 170° F., are withdrawn from the top of the secondary quench tower 21 and passed via line 31 to a blower 36, from which the gases are passed via line 37 to an indirect gas cooler 38 and thence to a first knockout tank 39 where condensable vapors, such as steam, and some oil is withdrawn via line 41 and preferably pumped via line 42 back to the settling tank 33. The effluent gases are then passed as overhead via line 43 to a compressor 44, preferably of the centrifugal type, where the gases are compressed. Because tars and other undesirable materials are effectively removed in the quenching step, the compressor 44 will operate efficiently without necessitating frequent cleaning and maintenance. Compression of the gases results in a rise in temperature and the hot compressed gases are conducted via line 46 to a gas cooler 47, where the gases are cooled, and thence passed to a second knockout tank 48, from which condensed vapors and some oil are removed via line 49 and preferably passed back to the settling tank 33 via line 42. The effluent gases thence are withdrawn as overhead and passed via line 51 to an indirect gas cooler 52, such as a tail gas exchanger, from which the gases are then passed to a third knockout tank 53, from which further condensed vapors and oils are withdrawn via line 54. The overhead from the third knockout tank 53 is then conducted via line 56 and passed to an indirect chiller or refrigerator 57 (utilizing propylene, sulfur dioxide, butane, isobutane, etc.) from which the cooled gases are then passed to a fourth knockout tank 58, further condensed vapors and oil then preferably being passed from the knockout tank via lines 59 and 42 to the settling tank 33.

The overhead from knockout tank 58 is then passed to a drier guard 61 (containing a bed of bauxite or the like) via line 62 and thence via line 63 to one or more dryers 64 wherein the gases are dried by contact with a bed of desiccant such as activated alumina. Were water used as the quenching media, the excessive amounts of water vapor could not be effectively removed by the knockout tanks, and, moreover, the desiccant would not have as long a useful life, especially where the gases still contained heavy olefinic hydrocarbons which tend to polymerize on contact with the desiccant and the resulting polymers deposit thereon.

The resultant dried gases are then conducted from the dryer 64 via line 66 to suitable equipment for the recovery and purification of acetylene and valuable components therefrom; suitable recovery and purification equipment and a method for operating the same are disclosed and claimed in U.S. Patent 2,814,359, issued November 26, 1957, to R. A. Koble. Heating gases can be supplied to the drier 64 via line 67 by passing them from a suitable gas heater 68 supplied with fuel gas via line 69, the used heating gases being withdrawn from the drier 64 via line 71 which is connected to a regenerative gas cooler 72 and then passed to a knockout drum or the like 73.

Referring now to Figure 2, a modication of the quench operation shown in Figure 1 is shown. In Figure 2 clean secondary quench oil, having a temperature between 86 and 165° F., is withdrawn from the settling tank 33 and pumped via line 81 to the upper end of the secondary quench tower 21. The tar-bearing quench oil is then withdrawn from the bottom of secondary quench tower 21 and pumped via line 82 to the upper end of the primary quench tower 17. The spent primary quench oil is then withdrawn from the lower end of the primary quench tower 17 via line 24 and cooled by means of air fin cooler 26, the resultant cooled quench oil then being further cooled by indirect heat exchange with cooler 28, and the finally cooled quench oil then being passed via line 83 to settling tank 33.

The embodiment illustrated in Figure 2 is in some respects more advantageous since the secondary quench oil is cleaner and is able to assure removal of tars and heavy olefinic hydrocarbons, whereas in Figure 1 the secondary quench oil employed is the tar-bearing primary quench oil which is loaded with the bulk of tars removed from the effluent in the primary quench tower.

The operation of the above described equipment according to the practice of this invention will now be described, and it should be realized that certain apparatus, such as valves, flow controllers, ratio flow controllers, meters, pressure indicating and recording equipment, temperature indicating and recording equipment, and the like, are provided at proper process points for maintaining proper control of the processes of this invention, such equipment, their installation and use being well understood by those skilled in the processing art.

Referring again to Figure 1, 9,267 moles per stream day of a hydrocarbon charge stock prepared by preheating a mixture of 5,948 mols/s.d. of a butane feed, containing a small amount of butylenes and other unsaturates, is thermally cracked within reactor 10 at a reaction temperature of about 2500° F. The reactor products are initially quenched by spraying 41,800 mols/s.d. of water within the downstream end of reactor 10, the temperature of the reactor effluent being lowered to about 1200° F. The resultant reactor effluent-steam mixture is then conducted from reactor 10 via line 16, the latter being preferably in heat exchange relation with the atmosphere so as to effect further cooling of the gases to a temperature of about 600° F. The reactor effluent is then conducted to the lower end of the primary quench tower 17 at a temperature of about 600° F. and at a rate of about 131,780 mols/s.d. Primary quench oil at a temperature of about 168° F. and at a rate of about 153,274 mols/s.d. is sprayed in the upper end of the primary quench tower 17 in direct contact to the countercurrent flowing effluent gases. The resulting quenching and scrubbing in the primary quench tower 17 results in the removal of a large proportion of the tars, heavy olefinic hydrocarbons, aromatics and other contaminants from the effluent gases, and results in cooling these gases to a temperature of about 185° F. The resultant cooled gases are removed as overhead from the primary quench tower 17 via line 22 and then passed to the lower end of the secondary quench tower 21 where they are further quenched, scrubbed and cooled upon direct contact with secondary quench oil supplied to the upper end of the quench tower 21 via line 29, the temperature of the secondary quench oil entering the quench tower being about 120° F. Further contact of the gases in this manner results in the removal of residual tars, aromatics, heavy olefinic hydrocarbons, and other contaminants therefrom and results in further cooling of the gases from a temperature of about 185° F. to about 135° F. The spent secondary quench oil is then withdrawn from the secondary quench tower 21 at a temperature of about 168° F. and passed to the settling tank 33.

The quenched reactor effluent gases, withdrawn as overhead from the upper end of the secondary quench tower 21 are then passed via line 31 to the blower 36, the temperature of the gases consequently increasing from 135° F. to 165° F. At this point in the operation, the effluent gases amount to 95,528 mols/s.d., of which 16,200 mols/s.d. is water and 220 mols/s.d. is oil. These gases are further cooled to about 100° F. by means of gas cooler 38 and are passed to the first knockout tank 39 where 10,970 mols/s.d. of water and 147 mols/s.d. of oil are removed. The overhead gases from the first knockout tank 39 amount to 84,411 mols/s.d., of which 5,230 mols/s.d. is water and 73 mols/s.d. is oil. These gases at a pressure of 15.7 p.s.i.a. and a temperature of 100° F. are then passed to centrifugal compressor 44 and compressed to a pressure of about 48.7 p.s.i.a. and a temperature of 371° F. The resultant compressed gases are then cooled in aftercooler 47 to a temperature of 100° F. with a consequent pressure drop to 45.2 p.s.i.a. The cooled compressed gases are then passed to the second knockout tank 48 where 3,488 mols/s.d. of water and 69 mols/s.d. of oil are removed. The overhead from the second knockout tank 48 has a pressure of about 44.7 p.s.i.a. and a temperature of 100° F., this overhead amounting to 80,854 mols/s.d., of which 1,742 mols/s.d. is water and 4 mols/s.d. is oil. The gases are then cooled in a tail gas cooler 52 (which uses the overhead gas from the acetylene absorber in the recovery train), wherein the gases are cooled to a temperature of 80° F. and at a pressure of about 43.7 p.s.i.a. These cooled gases are then passed to the third knockout drum 53 where in 787 mols/s.d. of water and 3 mols/s.d. of oil are removed. The gases are removed as overhead from knockout tank 53 at a temperature of 80° F. and a pressure of 43.2 p.s.i.a., these gases amounting to 80,064 mols/s.d. of which 955 mols/s.d. is water and 1 mol/s.d. is oil. These overhead gases are then cooled by chiller 57 to a temperature of 43° F., with a resultant pressure drop to 42.2 p.s.i.a. The gases are then passed to the fourth and last knockout tank 58 wherein 687 mols/s.d. of water and 1 mol/s.d. of oil are removed, the overhead from this knockout tank having a pressure of 41.7 p.s.i.a. and a temperature of 43° F., and amounting to 79,376 mols/s.d. of which 268 mols/s.d. is water. The gases are then passed via line 62 to dryer guard 61 and then to dryer 64 wherein the gases are dried upon contact with 32,140 lbs. (643 cu. ft.) of activated alumina. The dryer 64 removes 268 mols/s.d. of water, leaving a resultant gas stream amounting to 79,108 mols/s.d. to be directed to the recovery and purification train. This gaseous product has the following composition:

| | Mols/s.d. |
|---|---|
| $CO$ | 3,650 |
| $CO_2$ | 4,500 |
| $N_2$ | 44,150 |
| $H_2$ | 14,370 |
| $CH_4$ | 4,410 |
| $C_2H_2$ | 5,950 |
| $C_2H_4$ | 1,659 |
| $C_3H_4$ | 119 |
| $C_4H_2$ | 200 |
| $C_4H_4$ | 100 |

The quench oil employed in the practice of this invention is substantially any heavy oil, paraffinic or aromatic, which will flow and can be sprayed at the lowest temperatures involved. Oils which are preferably employed include benzene, toluene, anthracene, predominantly aromatic kerosene having, for example, a boiling point in the range of 200° F. to 500° F., and predominantly aromatic gas oil, such as a gas oil having a boiling range of 400° F. to 700° F. A preferred oil is a heavy aromatic oil which is produced in the cracking operation and permitted to accumulate in the process. A suitable oil which can be used for quenching according to this invention has the following specification:

Specific gravity at 60/60° F.=1.0655
Kinematic viscosity at 100° F.=14.38 centistokes
Kinematic viscosity at 210° F.=2.86 centistokes
Bureau of Mines correlation index=133
ASTM distillation, corrected to 760 mm. Hg=

| Percent: | ° F. |
|---|---|
| 5 | 413 |
| 10 | 428 |
| 20 | 450 |
| 30 | 479 |
| 40 | 515 |
| 50 | 558 |

Various modifications and alterations will become apparent to those skilled in the art without departing from the scope and spirit of this invention, and it is to be understood that the latter is not necessarily limited to the foregoing discussion and embodiments illustrated in the drawing.

I claim:

1. A process for quenching and scrubbing a high temperature cracked gas recovered from the thermal conversion of hydrocarbons, which comprises passing said high temperature cracked gas into a primary quenching zone; initially contacting said cracked gas with relatively cooler primary quench oil in said primary quenching zone in countercurrent flow; withdrawing cooled, partially tar-free gas overhead from said primary quenching zone; collecting a liquid mixture comprising water and oil in the lower end of said primary quenching zone; preparing said liquid mixture for use as relatively cooler secondary quench oil by cooling said liquid mixture; passing said cooled, partially tar-free gas into a secondary quenching zone; contacting said cooled, partially tar-free gas with said secondary quench oil in said secondary quenching zone in countercurrent flow; collecting a liquid mixture comprising water and oil in the lower end of said secondary quenching zone; preparing the latter mentioned liquid mixture for use as said primary quench oil by cooling said latter-mentioned liquid mixture; and withdrawing cooler, substantially tar-free gas overhead from said secondary quenching zone.

2. A process for quenching and scrubbing a high temperature cracked gas, containing water vapor recovered from the thermal conversion of hydrocarbons, said cracked gas comprising acetylene, tars, aromatics and higher olefinic hydrocarbons, which process comprises passing said high temperature cracked gas, at a temperature in the range of 470 to 800° F., into a primary quenching zone; initially contacting said gas with relatively cooler, predominantly aromatic, primary quench oil, having a temperature in the range of 95 to 240° F., in said primary quenching zone in countercurrent flow so as to rapidly reduce the temperature of said cracked gas and simultaneously absorb in said quench oil the bulk of said tars, aromatics, and higher olefinic hydrocarbons; withdrawing cooled, partially tar-free gas overhead, having a temperature in the range of 140 to 245° F., from said primary quenching zone; collecting a liquid mixture comprising oil, water, and said absorbed components in the lower end of said primary quenching zone; cooling said liquid mixture by indirect heat exchange and preparing the same for subsequent use as secondary quench oil; passing said cooled, partially tar-free gas into a secondary quenching zone; contacting said cooled, partially tar-free gas with said secondary quench oil, having a temperature in the range of 86 to 165° F., in said secondary quenching zone so as to further cool the same and simultaneously absorb in said secondary quench oil residual amounts of said tars, aromatics, and heavy olefinic hydrocarbons; collecting a liquid mixture comprising oil, water, and said absorbed components in the lower end of said secondary quenching zone; preparing said latter-mentioned liquid mixture for use as said primary quench oil by cooling said latter-mentioned liquid mixture; and withdrawing cooler, substantially tar-free gas overhead from said secondary quenching zone.

3. In a method of manufacturing acetylene by the thermal conversion of a gaseous hydrocarbon wherein there is produced a high temperature cracked gas comprising acetylene, higher acetylenes, olefins, higher olefins, aromatics, tars, and water vapor, the steps comprising passing said high temperature cracked gas, at a temperature in the range of 470 to 800° F., into a primary quenching zone; initially contacting said gas with relatively cooler, predominantly aromatic, primary quench oil, having a temperature in the range of 95 to 240° F., in said primary quenching zone in countercurrent flow so as to rapidly reduce the temperature of said cracked gas and simultaneously absorb in said quench oil the bulk of said tars, aromatics, and higher olefinic hydrocarbons; withdrawing cooled, partially tar-free gas overhead, having a temperature in the range of 140 to 245° F., from said primary quenching zone; collecting a liquid mixture comprising oil, water, and said absorbed components in the lower end of said primary quenching zone; cooling said liquid mixture by indirect heat exchange and preparing the same for subsequent use as secondary quench oil; passing said cooled, partially tar-free gas into a secondary quenching zone; contacting said cooled, partially tar-free gas with said secondary quench oil, having a temperature in the range of 86 to 165° F., in said secondary quenching zone so as to further cool the same and simultaneously absorb in said secondary quench oil residual amounts of said tars, aromatics, and heavy olefinic hydrocarbons; collecting a liquid mixture comprising oil, water, and said absorbed components in the lower end of said secondary quenching zone; preparing said latter-mentioned liquid mixture for use as said primary quench oil by cooling said latter-mentioned liquid mixture; withdrawing cooler, substantially tar-free gas overhead from said secondary quenching zone; compressing said substantially tar-free gas; cooling the resulting compressed gas; and removing residual amounts of oil and water from said compressed gas.

4. In a method of manufacturing acetylene by the thermal conversion of a gaseous hydrocarbon wherein there is produced a high temperature cracked gas comprising acetylene, higher acetylenes, olefins, higher olefins, aromatics, tars, and water vapor, the steps comprising passing said high temperature cracked gas, as at temperature in the range of 470 to 800° F., into a primary quenching zone; initially contacting said gas with relatively cooler, predominantly aromatic, primary quench oil, having a temperature in the range of 95 to 240° F., in said primary quenching zone in countercurrent flow so as to rapidly reduce the temperature of said cracked gas and simultaneously absorb in said quench oil the bulk of said tars, aromatics, and higher olefinic hydrocarbons; withdrawing cooled, partially tar-free gas overhead, having a temperature in the range of 140 to 245° F., from said primary quenching zone; collecting a liquid mixture comprising oil, water, and said absorbed components in the lower end of said primary quenching zone; cooling said liquid mixture by indirect heat exchange and passing the same to a liquid separation zone; withdrawing oil from said liquid separation zone for subsequent use as secondary quench oil; passing said cooled, partially tar-free gas into a secondary quenching zone; contacting said cooled, partially tar-free gas with said secondary quench oil, having a temperature in the range of 86 to 165° F., in said secondary quenching zone so as to further cool the same and simultaneously absorb in said secondary quench oil residual amounts of said tars, aromatics, and heavy olefinic hydrocarbons; collecting a liquid mixture comprising oil, water, and said absorbed components in the lower end of said secondary quenching zone for use as said primary quench oil; withdrawing cooler, substantially tar-free gas overhead from said secondary quenching zone; compressing said substantially tar-free gas; cooling the resulting compressed gas; and removing residual amounts of oil and water from said compressed gas.

5. In a method of manufacturing acetylene by the thermal conversion of a gaseous hydrocarbon in a thermal reactor, wherein a high temperature cracked gas is initially quenched with water introduced in the downstream end of said furnace, said cracked gas comprising acetylene, higher acetylenes, olefins, higher olefins, aromatics, and tars, the steps comprising passing said high temperature cracked gas, at a temperature in the range of 470 to 800° F., into a primary quenching zone; initially contacting said gas with relatively cooler, predominantly aromatic, primary quench oil, having a temperature in the range of 95 to 240° F., in said primary quenching zone in countercurrent flow so as to rapidly reduce the temperature of said cracked gas and simultaneously absorb in said quench oil the bulk of said tars, aromatics, and higher olefinic hydrocarbons; withdrawing cooled, partially tar-free gas overhead, having a temperature in the range of 140 to 245° F., from said primary quenching zone; collecting a liquid mixture comprising oil, water, and said absorbed components in the lower end of said primary quenching zone; cooling said liquid mixture by indirect heat exchange and passing the same to a liquid separation zone; withdrawing water from said liquid separation zone and recycling the same to said downstream end of said furnace so as to initially quench said cracked gas therewith; withdrawing oil from said liquid separation zone for subsequent use as secondary quench oil; passing said cooled, partially tar-free gas into a secondary quenching zone; contacting said cooled, partially tar-free gas with said secondary quench oil, having a temperature in the range of 86 to 165° F., in said secondary quenching zone so as to further cool the same and simultaneously absorb in said secondary quench oil residual amounts of said tars, aromatics, and heavy olefinic hydrocarbons; collecting a liquid mixture comprising oil, water, and said absorbed components in the lower end of said secondary quenching zone for use as said primary quench oil; withdrawing cooler, substantially tar-free gas overhead from said secondary quenching zone; compressing said substantially tar-free gas; cooling the resulting compressed gas; and removing residual amounts of oil and water from said compressed gas.

6. In a method of manufacturing acetylene by the thermal conversion of a gaseous hydrocarbon wherein there is produced a high temperature cracked gas comprising acetylene, higher acetylenes, olefins, higher olefins, aromatics, tars, and water vapor, the steps comprising passing said high temperature cracked gas, at a temperature in the range of 470 to 800° F., into a primary quenching zone; initially contacting said gas with relatively cooler, predominantly aromatic, primary quench oil, having a temperature in the range of 95 to 240° F., in said primary quenching zone in countercurrent flow so as to rapidly reduce the temperature of said cracked gas and simultaneously absorb in said quench oil the bulk of said tars, aromatics, and higher olefinic hydrocarbons; withdrawing cooled, partially tar-free gas overhead, having a temperature in the range of 140 to 245° F., from said primary quenching zone; collecting a liquid mixture comprising oil, water, and said absorbed components in the lower end of said primary quenching zone; cooling said liquid mixture by indirect heat exchange for subsequent use as secondary quench oil; passing said cooled, partially tar-free gas into a secondary quenching zone; contacting said cooled, partially tar-free gas with said secondary quench oil, having a temperature in the range of 86 to 165° F., in said secondary quenching zone so as to further cool the same and simultaneously absorb in said secondary quench oil residual amounts of said tars, aromatics, and heavy olefinic hydrocarbons; collecting a liquid mixture comprising oil, water, and said absorbed components in the lower end of said secondary quenching zone; passing said latter mentioned liquid mixture to a liquid separation zone; withdrawing oil from said liquid separation zone for use as said primary quench oil; withdrawing cooler, substantially tar-free gas overhead from said secondary quenching zone; compressing said substantially tar-free gas; cooling the resulting compressed gas; and removing residual amounts of oil and water from said compressed gas.

7. In a method of manufacturing acetylene by the thermal conversion of a gaseous hydrocarbon in a thermal reactor, wherein a high temperature cracked gas is initially quenched with water introduced in the downstream end of said furnace, said cracked gas comprising acetylene, higher acetylenes, olefins, higher olefins, aromatics, and tars, the steps comprising passing said high temperature cracked gas, at a temperature in the range of 470 to 800° F., into a primary quenching zone; initially contacting said gas with relatively cooler, predominantly aromatic, primary quench oil, having a temperature in the range of 95 to 240° F., in said primary quenching zone in countercurrent flow so as to rapidly reduce the temperature of said cracked gas and simultaneously absorb in said quench oil the bulk of said tars, aromatics, and higher olefinic hydrocarbons; withdrawing cooled, partially tar-free gas overhead, having a temperature in the range of 140 to 245° F., from said primary quenching zone; collecting a liquid mixture comprising oil, water, and said absorbed components in the lower end of said primary quenching zone; cooling said liquid mixture by indirect heat exchange for subsequent use as secondary quench oil; passing said cooled, partially tar-free gas into a secondary quenching zone; contacting said cooled, partially tar-free gas with said secondary quench oil, having a temperature in the range of 86 to 165° F., in said secondary quenching zone so as to further cool the same and simultaneously absorb in said secondary quench oil residual amounts of said tars, aromatics, and heavy olefinic hydrocarbons; collecting a liquid mixture comprising oil, water, and said absorbed components in the lower end of said secondary quenching zone; passing said latter mentioned liquid mixture to a liquid separation zone; withdrawing oil from said liquid separation zone for use as said primary quench oil; withdrawing water from said liquid separation zone and recycling the same to said downstream end of said reactor so as to initially quench said cracked gas therewith; withdrawing cooler, substantially tar-free gas overhead from said secondary quenching zone; compressing said substantially tar-free gas; cooling the resulting compressed gas; and removing residual amounts of oil and water from said compressed gas.

8. Apparatus for quenching and scrubbing a gas recovered from the thermal conversion of hydrocarbons, which comprises, in combination, a first gas-liquid contact tower; gas inlet means in the lower part of said tower; gas outlet means in the upper part of said tower; heat exchange liquid inlet means in the upper portion of said tower; means for withdrawing liquid from the lower portion of said tower; a second gas-liquid contact tower; gas conduit means for passing gas from said gas outlet means to the lower part of said second tower; gas outlet means in the upper part of said second tower; heat exchange liquid inlet means in the upper portion of said second tower; means for withdrawing liquid from the lower portion of said second tower; air cooled indirect heat exchange means operatively connected with said means for withdrawing liquid from the lower portion of said first tower; conduit means operatively connected to said indirect heat exchange means and said heat exchange liquid inlet means in the upper portion of said second tower; conduit means operatively connecting said means for withdrawing liquid from the lower portion of said second tower with said heat exchange liquid inlet means in the upper portion of said first tower; indirect heat exchange means operatively connected to said gas outlet means in the upper part of said second tower; a first gas-liquid separation means operatively connected to said last mentioned indirect heat exchange means; gas compressor means operatively connected to the latter-mentioned first separation means; a plurality of alternating indirect heat exchange means and second gas-liquid separation means operatively connected to said gas compressor means; and gas drying means operatively connected to the last of said second gas-liquid separation means.

9. Apparatus for quenching and scrubbing a gas recovered from the exit of a thermal cracking reactor, which comprises, in combination, a first gas-liquid contact tower; a gas conduit means for passing gas from said reactor exit to the lower part of said first tower; a second gas-liquid contact tower; a gas conduit means for passing gas overhead from the upper part of said first tower to the lower part of said second tower; first conduit means for introducing oil into the upper portion of said first tower; second conduit means for introducing oil into the upper portion of said second tower; first liquid withdrawal conduit means for withdrawing a liquid mixture from the lower portion of said first tower; air cooled indirect heat exchange means operatively connected to said first liquid withdrawal conduit means; said second conduit means operatively connected to said indirect heat exchange means; second liquid withdrawal conduit means for withdrawing a liquid mixture from the lower portion of said second tower; liquid separation means operatively connected to said second liquid withdrawal means; third liquid withdrawal conduit means adapted to withdraw oil from said liquid separation means; third conduit means for withdrawing water from said liquid separation means and adapted to supply the same to the downstream end of said reactor; fourth conduit means for withdrawing gas overhead from the upper part of said second tower; blower means operatively connected to said fourth conduit means; indirect heat exchange means operatively connected to said fourth conduit means downstream of said blower means; first gas-liquid separation means operatively connected to said last-mentioned indirect heat exchange means; a gas compressor operatively connected by a fifth conduit means to the upper end of said first gas-liquid separation means; a plurality of alternating indirect heat exchange means and second gas-liquid separation means operatively communicating with a sixth conduit means, the upstream end of which is operatively connected to said gas compressor; and gas drying means operatively connected to the downstream end of said sixth conduit means.

10. Apparatus for quenching and scrubbing a gas recovered from the exit of a thermal cracking reactor, which comprises, in combination, a first gas-liquid contact tower; a gas conduit means for passing gas from said reactor exit to the lower part of said first tower; a second gas-liquid contact tower; a gas conduit means for passing gas overhead from the upper part of said first tower to the lower part of said second tower; first conduit means for introducing oil into the upper portion of said first tower; second conduit means for introducing oil into the upper portion of said second tower; first liquid withdrawal conduit means for withdrawing a liquid mixture from the lower portion of said first tower; air cooled indirect heat exchange means operatively connected to said first liquid withdrawal conduit means; liquid separation means operatively connected to said indirect heat exchange means; said second conduit adapted to withdraw oil from said liquid separation means; third conduit means for withdrawing water from said liquid separation means and adapted to supply the same to the downstream end of said reactor; second withdrawal conduit means for withdrawing liquid mixture for the lower portion of said second tower and adapted to supply the same to said first conduit means; fourth conduit means for withdrawing gas overhead from the upper part of said second tower; blower means operatively connected to said fourth conduit means; indirect heat exchange means operatively connected to said fourth conduit means downstream of said blower means; first gas-liquid separation means operatively connected to said last-mentioned indirect heat exchange means; a gas compressor operatively connected by a fifth conduit means to the upper end of said first gas-liquid separation means; a plurality of alternating indirect heat exchange means and second gas-liquid separation means operatively communicating with a sixth conduit means, the upstream end of which is operatively connected to said gas compressor; and gas drying means operatively connected to the downstream end of said sixth conduit means.

References Cited in the file of this patent

UNITED STATES PATENTS

| | | |
|---|---|---|
| 2,173,877 | Clark et al. | Sept. 26, 1939 |
| 2,233,841 | Lepsoe | Mar. 4, 1941 |
| 2,348,659 | Smith et al. | May 9, 1944 |
| 2,405,395 | Bahlke et al. | Aug. 6, 1946 |
| 2,741,332 | Finneran et al. | Apr. 10, 1956 |
| 2,810,450 | Hartmann | Oct. 22, 1957 |